(12) United States Patent
Tamayori

(10) Patent No.: US 8,020,829 B1
(45) Date of Patent: Sep. 20, 2011

(54) MEDIA PLAYER HOLDER APPARATUS

(76) Inventor: Nelson Tamayori, Aiea, HI (US)

( * ) Notice: Subject to any disclaimer, the term of this patent is extended or adjusted under 35 U.S.C. 154(b) by 192 days.

(21) Appl. No.: 12/423,765

(22) Filed: Apr. 14, 2009

(51) Int. Cl.
*A47B 97/04* (2006.01)

(52) U.S. Cl. ............... 248/447.2; 248/445; 248/460; 248/451; 248/453; 248/123.2; 248/441.1; 248/454; 248/458; 248/231.71; 248/181.1; 108/144.11

(58) Field of Classification Search ............. 248/445, 248/460, 451, 453, 123.2, 441.1, 454, 447.2, 248/458, 231.71, 181.1; 108/144.11
See application file for complete search history.

(56) References Cited

U.S. PATENT DOCUMENTS

| | | | | |
|---|---|---|---|---|
| 161,026 A | * | 3/1875 | Grummon | 248/457 |
| 230,446 A | * | 7/1880 | Strange | 248/447.2 |
| 245,512 A | * | 8/1881 | Lambie | 248/451 |
| 431,036 A | * | 7/1890 | Dawson | 248/454 |
| 470,207 A | * | 3/1892 | Morrison | 248/454 |
| 485,471 A | * | 11/1892 | Morrison | 248/454 |
| 588,208 A | * | 8/1897 | Woods | 248/451 |
| 598,689 A | * | 2/1898 | Wilson | 248/451 |
| 794,099 A | * | 7/1905 | Heaney | 248/442.2 |
| 834,553 A | * | 10/1906 | Bartlett | 248/454 |
| 979,070 A | * | 12/1910 | Hoffman | 248/447.2 |
| 1,300,045 A | * | 4/1919 | Tavi | 248/453 |
| 1,320,439 A | * | 11/1919 | Andresiak | 248/447.2 |
| 1,335,308 A | * | 3/1920 | Wilson | 248/316.1 |
| 1,377,230 A | * | 5/1921 | Taylor | 248/454 |
| 1,460,697 A | * | 7/1923 | Bendlin | 248/276.1 |
| 1,654,027 A | * | 12/1927 | Westerfors | 248/445 |
| 1,821,060 A | * | 9/1931 | Isaacson | 248/455 |
| 1,900,401 A | * | 3/1933 | Scully | 40/661.06 |
| 2,950,836 A | * | 8/1960 | Murdock | 220/576 |
| 3,304,035 A | * | 2/1967 | Davis | 248/516 |
| 3,889,914 A | * | 6/1975 | Torme | 248/445 |
| 4,645,167 A | * | 2/1987 | Hardwick | 248/520 |
| 4,946,202 A | * | 8/1990 | Perricone | 285/153.2 |
| 4,984,760 A | * | 1/1991 | Cohn et al. | 248/126 |
| 5,154,391 A | * | 10/1992 | Hegarty | 248/454 |
| 5,177,616 A | | 1/1993 | Riday | |
| 5,177,665 A | * | 1/1993 | Frank et al. | 361/679.43 |
| 5,246,240 A | | 9/1993 | Romich et al. | |
| D364,592 S | | 11/1995 | Thompson | |
| 5,485,793 A | * | 1/1996 | Crowell | 108/44 |
| 5,709,365 A | * | 1/1998 | Howard | 248/454 |
| 5,713,548 A | * | 2/1998 | Boyer et al. | 248/205.2 |
| 5,876,005 A | * | 3/1999 | Vasconi | 248/276.1 |
| 5,937,765 A | * | 8/1999 | Stirling | 108/43 |
| 6,038,983 A | * | 3/2000 | Lendl | 108/44 |
| 6,104,443 A | | 8/2000 | Adcock et al. | |
| 6,109,434 A | * | 8/2000 | Howard, Jr. | 206/320 |
| 6,269,948 B1 | * | 8/2001 | Jackson | 206/320 |
| 6,439,612 B1 | * | 8/2002 | Greer | 281/45 |

(Continued)

*Primary Examiner* — Nkeisha Smith
(74) *Attorney, Agent, or Firm* — Crossley Patent Law; Mark A. Crossley

(57) ABSTRACT

The media player holder apparatus is easily, adjustably, and removably clamped onto an existing object. The clamp provides for adjustable gap without full separation of the two clamp halves. A stalk connects the clamp to a ball joint with selectively retained positioning via the clamp screw. The telescopic arm connected to the ball joint provides distance selectivity of the upper ball joint from the ball joint. The frictionally positioned upper ball joint positions the platform. The removable tray is positioned atop the platform with the multi-plane adjustment providing optimal positioning of a media player. The tray is hingedly lidded and further comprises a frictional surface within, with half straps for retaining a media player or other such device.

6 Claims, 4 Drawing Sheets

U.S. PATENT DOCUMENTS

| | | | |
|---|---|---|---|
| 6,663,072 B1 * | 12/2003 | Ritchey et al. | 248/444 |
| 6,679,468 B1 * | 1/2004 | Hsu | 248/454 |
| 6,796,536 B1 * | 9/2004 | Sevier, IV | 248/121 |
| 6,834,839 B1 * | 12/2004 | Wilson | 248/316.6 |
| 6,979,004 B2 | 12/2005 | Otteriee et al. | |
| 7,017,878 B2 * | 3/2006 | Guo et al. | 248/309.1 |
| 7,172,167 B2 * | 2/2007 | Phifer et al. | 248/460 |
| D543,167 S | 5/2007 | Hung | |
| 7,336,258 B1 * | 2/2008 | Goetsch et al. | 345/163 |
| 7,458,555 B2 * | 12/2008 | Mastropaolo et al. | 248/447.2 |
| 7,686,275 B2 * | 3/2010 | Scarcello | 248/480 |
| 2002/0044819 A1 * | 4/2002 | Shamoon | 402/73 |
| 2005/0077448 A1 * | 4/2005 | Rossini | 248/441.1 |
| 2006/0113342 A1 | 6/2006 | Hampton et al. | |
| 2008/0042384 A1 | 2/2008 | Ferraioli | |

\* cited by examiner

MEDIA PLAYER HOLDER APPARATUS

Be it known that I, Nelson Tamayori, a citizen of the United States, have invented new and useful improvements in a media player holder apparatus as described in this specification.

BACKGROUND OF THE INVENTION

There is often a need to support a media player on a child's stroller, a high chair, an auto child seat, a wheelchair, an airport lounge seat or other chair or object where a media player can be used. Devices for doing so that have been presented in the past are typically insufficient with regard to optimal positioning and retention of a media player. And, some devices are overly complex, which increases production and sales costs, as well as operator difficulty. The present apparatus selectively clamps to an existing object to support a media player upon a tray with hinged cover. The multi-plane adjustments provide that children and adults alike have the advantage of correctly and easily positioning a media player in relation to a given seat or other support device.

FIELD OF THE INVENTION

The media player holder apparatus relates to devices for supporting various media players and more especially to a portable media player holder apparatus that provides multiple plane and distance positioning of a platform to which a media player tray with cover is removably attached.

SUMMARY OF THE INVENTION

The general purpose of the media player holder apparatus, described subsequently in greater detail, is to provide a media player holder apparatus which has many novel features that result in an improved media player holder apparatus which is not anticipated, rendered obvious, suggested, or even implied by prior art, either alone or in combination thereof.

To attain this, the media player holder apparatus is easily, adjustably, and removably clamped onto an existing object. The clamp provides for adjustable gap without full separation of the two clamp halves. A stalk connects the clamp to a ball joint with selectively retained positioning via the clamp screw. The telescopic arm connected to the ball joint provides distance selectivity of the upper ball joint from the ball joint. The frictionally positioned upper ball joint positions the platform. The tray is positioned atop the platform. The most complete embodiment of the apparatus features a removable tray. The tray is hingedly lidded and further comprises a frictional surface within, with half straps for retaining a media player or other such device.

Thus has been broadly outlined the more important features of the improved media player holder apparatus so that the detailed description thereof that follows may be better understood and in order that the present contribution to the art may be better appreciated.

An object of the media player holder apparatus is to provide a portable holder apparatus for a media player.

Another object of the media player holder apparatus is to provide multiple plane adjustment for best positioning of a media player.

An object of the media player holder apparatus is to provide for distance adjustment between a player and a user.

A further object of the media player holder apparatus is to provide easy adjustment of media player positioning.

An added object of the media player holder apparatus is to provide a removably attached tray for the media player platform.

And, an object of the media player holder apparatus is to securely house a media player, both on and off the platform.

These together with additional objects, features and advantages of the improved media player holder apparatus will be readily apparent to those of ordinary skill in the art upon reading the following detailed description of presently preferred, but nonetheless illustrative, embodiments of the improved media player holder apparatus when taken in conjunction with the accompanying drawings.

In this respect, before explaining the current embodiments of the improved media player holder apparatus in detail, it is to be understood that the media player holder apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved media player holder apparatus. It is therefore important that the claims be regarded as including such equivalent constructions insofar as they do not depart from the spirit and scope of the media player holder apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the media player holder apparatus generally designated by the reference number 10 will be described.

Figure 1:
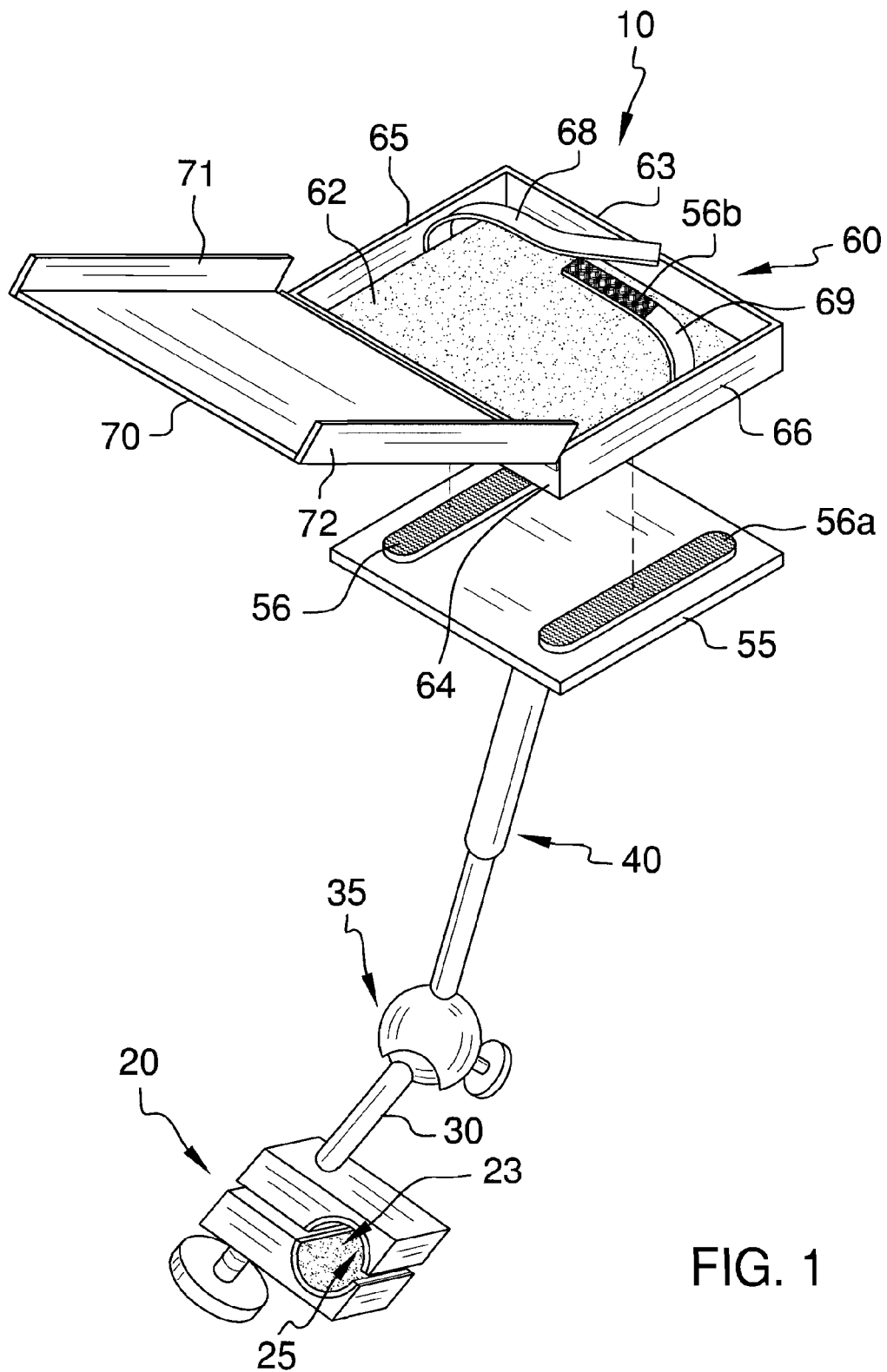
FIG. 1 is a perspective view.
Figure 3:
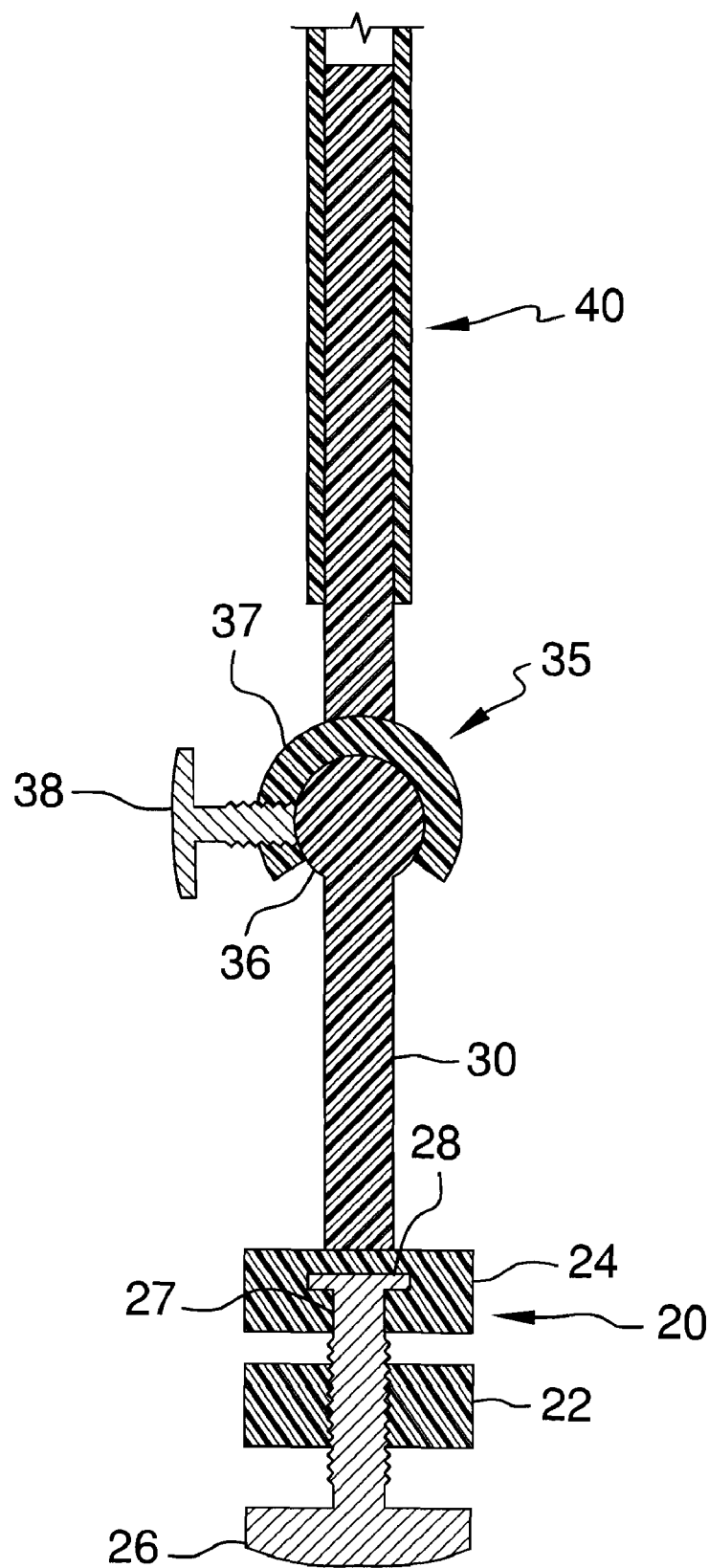
FIG. 3 is a partial cross sectional view of FIG. 2, taken along the line 3-3.
Figure 4:
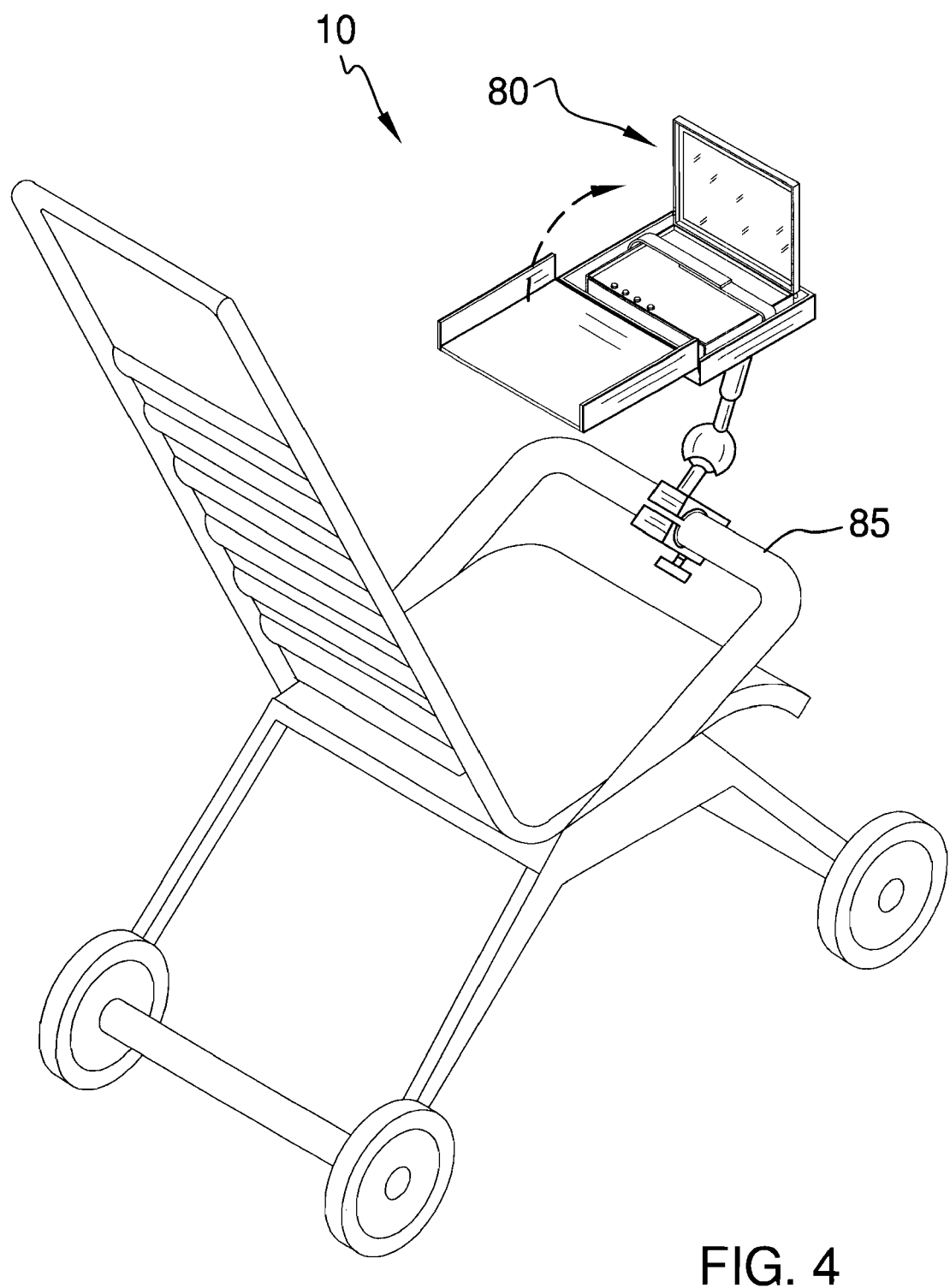
FIG. 4 is a perspective view of the apparatus in use.

Referring to FIGS. 1, 3, and 4, the apparatus 10 partially comprises a clamp 20 removably attached to an existing object such as the chair member 85. The clamp 20 comprises a clamp first half 22 adjustably opposed by the clamp second half 24. The first receptacle 23 is disposed within the clamp first half 22. The threaded thumbscrew 26 is disposed through the clamp first half 22. The clamp second half 24 comprises the second receptacle 25. The second receptacle 25 is in alignment with the first receptacle 23. The receptacles form an adjustably spaced gap within which various objects can be clamped via the threaded thumbscrew 26 to support the apparatus 10, objects such as the chair member 85, for example. The grip coating 29 within each receptacle aids in holding the clamp 20 to a chosen object. The threadbare section 27 of the threaded thumbscrew 26 is rotatably disposed within the clamp second half 24. The retaining plate 28 is disposed on the end of the threadbare section 27. The retaining plate 28 is rotatably captured within the clamp second half 24 and prevents separation of the clamp 20.

Figure 2:
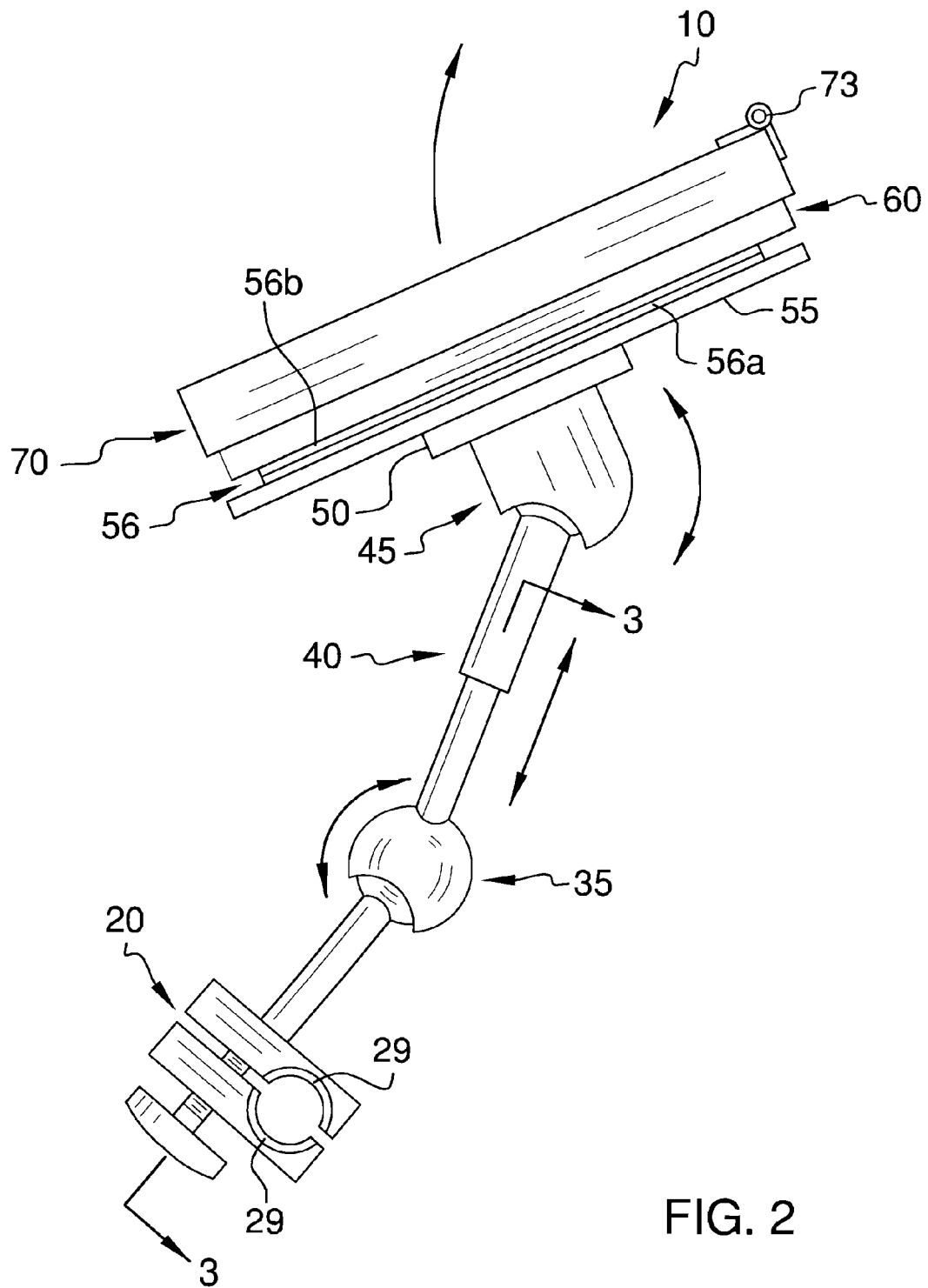
FIG. 2 is a lateral elevation view.

Referring to FIG. 2 and continuing to refer to FIG. 1, the stalk 30 is extended from the clamp second half 24. The ball joint 35 is connected to the stalk 30. The ball joint 35 has a ball 36 rotatably fitted within the socket 37. The clamp screw 38 selectively positions the ball 36 within the socket 37 by threadably passing through the socket 37 and selectively impinging upon the ball 36. The telescopic arm 40 is extended from the socket 37. The telescopic arm 40 provides selectively retained length change by frictional engagement within. The friction impinged upper ball joint 45 is affixed to the telescopic arm 40.

Referring again to FIGS. 1 and 2, the flange 50 is affixed atop the upper ball joint 45. The rectangular platform 55 is affixed atop the mount flange 50. Hook 56a of a hook and loop 56 is disposed atop the platform 55. The rectangular tray 60 is removably disposed atop the platform 55. The tray 60 has loop 56b of hook and loop 56 attracted to the hook 56a of the platform 55. The tray 60 is bounded by a front wall 63 spaced apart from a back wall 64 and a first side wall 65 spaced apart from a second side wall 66. The first half strap 68 is affixed to the first side wall 65. The second half strap 69 is affixed to the second side wall 66. Hook and loop 56 (only loop 56b shown) selectively links the half straps. A frictional surface 62 is disposed within the tray 60 to aid in securing an existing media player 80. The lid 70 is hingedly affixed to the tray 60 back wall 64 via the hinge 73. The lid 70 has a first side 71 spaced apart from a second side 72. The lid 70 selectively covers the tray 60. Removability of the tray 60 provides for carrying a media player 80 within the tray 60, secured by the lid 70 and half straps against damage or loss. For but one example, the tray 60 with media player 80 might be personally carried on an airplane while the remainder of the apparatus 10 is stowed or checked.

Referring again to FIGS. 1 and 4, the removability of the tray 60 from the platform 55 further enables the tray 60 with hinged lid 70 to face either direction. A further advantage is provided herein in that the lid 70 may be faced toward a child in a child stroller, for example, thereby prohibiting the child access to media player 80 controls as desired.

With respect to the above description then, it is to be realized that the optimum dimensional relationships for the parts of the media player holder apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the media player holder apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the media player holder apparatus may be used.

Therefore, the foregoing is considered as illustrative only of the principles of the media player holder apparatus. Further, since numerous modifications and changes will readily occur to those skilled in the art, it is not desired to limit the media player holder apparatus to the exact construction and operation shown and described, and accordingly, all suitable modifications and equivalents may be resorted to, falling within the scope of the media player holder apparatus.

What is claimed is:

1. A media player holder apparatus, comprising, in combination:
   a clamp removably attached to an existing object, the clamp comprising:
   a clamp first half;
   a first receptacle disposed within the clamp first half;
   a clamp second half;
   a second receptacle disposed within the clamp second half, the second receptacle in alignment with the first receptacle;
   a threaded thumbscrew connecting the clamp first half and second half, the thumbscrew providing an adjustable space between the first receptacle and the second receptacle;
   a stalk extended from the clamp second half;
   a ball joint connected to the stalk, the ball joint having a ball rotatably fitted within a socket;
   means selectively impinging movement of the ball within the socket;
   a telescopic arm extended from the socket;
   a friction impinged upper ball joint affixed to the telescopic arm;
   a mount flange affixed atop the upper ball joint;
   a rectangular platform affixed atop the mount flange;
   at least two hook sections of a hook and loop fabric fixed to a top surface of the platform;
   a rectangular tray disposed atop the platform, the tray bounded by a front wall spaced apart from a back wall, a first side wall spaced apart from a second side wall;
   a frictional surface within the tray;
   at least two loop sections of a hook and loop fabric fixed to the bottom surface of the tray;
   a lid hingedly affixed to the tray back wall, the lid having a first side spaced apart from a second side, the lid selectively covering the tray.

2. The apparatus according to claim 1 further comprising a grip coating disposed on each receptacle.

3. The apparatus according to claim 1 wherein the clamp further comprises a threadbare section of the threaded thumbscrew rotatably disposed within the clamp second half;
   a retaining plate disposed on the threadbare section, the retaining plate rotatably captured within the clamp second half.

4. The apparatus according to claim 2 wherein the clamp further comprises a threadbare section of the threaded thumbscrew rotatably disposed within the clamp second half;
   a retaining plate disposed on the threadbare section, the retaining plate rotatably captured within the clamp second half.

5. A media player holder apparatus, comprising, in combination:
   a clamp removably attached to an existing object, the clamp comprising:
   a clamp first half;
   a first receptacle disposed within the clamp first half;
   a threaded thumbscrew disposed through the clamp first half;
   a clamp second half;
   a second receptacle disposed within the clamp second half, the second receptacle in alignment with the first receptacle;
   a grip coating disposed on each receptacle;
   a threadbare section of the threaded thumbscrew rotatably disposed within the clamp second half;
   a retaining plate disposed on the threadbare section, the retaining plate rotatably captured within the clamp second half;
   a stalk extended from the clamp second half;
   a ball joint connected to the stalk, the ball joint having a ball rotatably fitted within a socket;
   a clamp screw selectively positioning the ball within the socket;
   a telescopic arm extended from the socket;

a friction impinged upper ball joint affixed to the telescopic arm;
a mount flange affixed atop the upper ball joint;
a rectangular platform affixed atop the mount flange;
at least two hook sections of a hook and loop fabric fixed to a top surface of the platform;
a rectangular tray disposed atop the platform, the tray bounded by a front wall spaced apart from a back wall, a first side wall spaced apart from a second side wall;
at least two loop sections of a hook and loop fabric fixed to the bottom surface of the tray;
a first half strap affixed to the first side wall;
a second half strap affixed to the second side wall;
a hook and loop selectively linking the half straps;
a frictional surface within the tray;
a lid hingedly affixed to the tray back wall, the lid having a first side spaced apart from a second side, the lid selectively covering the tray.

6. A media player holder apparatus, comprising, in combination:
a clamp removably attached to an existing object, the clamp comprising:
a clamp first half;
a first receptacle disposed within the clamp first half;
a threaded thumbscrew disposed through the clamp first half;
a clamp second half;
a second receptacle disposed within the clamp second half, the second receptacle in alignment with the first receptacle;
a grip coating disposed on each receptacle;
a threadbare section of the threaded thumbscrew rotatably disposed within the clamp second half;
a retaining plate disposed on the threadbare section, the retaining plate rotatably captured within the clamp second half;
a stalk extended from the clamp second half;
a ball joint connected to the stalk, the ball joint having a ball rotatably fitted within a socket;
a clamp screw selectively positioning the ball within the socket;
a frictionally positioned telescopic arm extended from the socket;
a friction impinged upper ball joint affixed to the telescopic arm;
a mount flange affixed atop the upper ball joint;
a rectangular platform affixed atop the mount flange;
at least two hook sections of a hook and loop fabric fixed to a top surface of the platform;
a rectangular tray configured to be removably disposed atop the platform, the tray bounded by a front wall spaced apart from a back wall, a first side wall spaced apart from a second side wall;
at least two loop sections of a hook and loop fabric fixed to the bottom surface of the tray;
a first half strap affixed to the first side wall;
a second half strap affixed to the second side wall;
a hook and loop selectively linking the half straps;
a frictional surface within the tray;
a lid hingedly affixed to the tray back wall, the lid having a first side spaced apart from a second side, the lid selectively covering the tray.

* * * * *